United States Patent [19]

Hamm

[11] 4,217,537

[45] Aug. 12, 1980

[54] CHAIN SAW DRIVEN GENERATOR

[76] Inventor: David E. Hamm, 1616 SW. Sunset Blvd., Portland, Oreg. 97201

[21] Appl. No.: 894,560

[22] Filed: Apr. 7, 1978

[51] Int. Cl.² .................... H02J 9/14; H02J 7/32
[52] U.S. Cl. ............................. 320/56; 30/500; 74/11; 290/1 R; 322/1
[58] Field of Search ............... 322/1, 38, 40–43; 290/1 R; 30/122, 123, 166 A, 500; 302/9; 320/56; 74/11; 180/53

[56] References Cited

U.S. PATENT DOCUMENTS

| 568,209 | 9/1896 | Rodriguez | 322/42 X |
| 2,204,943 | 6/1940 | Mercer | 74/11 |
| 3,006,221 | 10/1961 | Cromwell | 290/1 R X |
| 3,583,106 | 6/1971 | Dobbertin | 30/122 X |

*Primary Examiner*—Robert J. Hickey
*Attorney, Agent, or Firm*—Kolisch, Hartwell, Dickinson & Stuart

[57] ABSTRACT

Apparatus and method employing the engine unit of a conventional chain saw to power an electrical generator. In a first embodiment, a generator is detachably mounted to the engine unit, with an endless belt drivingly connecting the two. A second embodiment includes an engine unit of the above-described type operatively connected to a vehicle-mounted alternator.

2 Claims, 5 Drawing Figures

CHAIN SAW DRIVEN GENERATOR

BACKGROUND AND SUMMARY

The present invention relates to electrical generators, and particularly to a portable electrical generator powered by the engine unit of a conventional chain saw.

Often motorists are faced with the problem of starting a vehicle which has a weak or dead battery. This problem typically is solved by "jumping" the weak battery with a second charged battery. Generally this necessitates an expensive and time-consuming service call, and in remote areas, such as are accessible only by off-road vehicles, may present considerable expense and hardship.

It is also known that many motorists, particularly those using their vehicles for off-road purposes, carry in their vehicles conventional chain saws. This practice is especially common in regions such as the Northwestern United States where people often are engaged in clearing brush, collecting firewood, or the like, in off-road locations.

In view of the above, it is desirable to provide motorists with an apparatus for adapting a chain saw for use in charging a vehicle battery. The present invention comprises an electrical generator adapted to be mounted to the engine unit of a conventional chain saw. The engine unit includes a power-driven shaft on which the normal chain sprocket has been replaced by a pulley, and mounting bolts from which the conventional chain saw cutter bar has been removed. The generator is a belt-driven alternator which is detachably mounted to the engine unit by a bracket secured to the engine unit bolts. An endless belt operatively connects the engine unit with the alternator.

The above-described chain saw driven generator may be used generally as a hand portable electrical generator. With the appropriate voltage output, the generator could power outdoor lighting, electrical appliances, tools, or the like. Such apparatus would be particularly useful in remote areas.

A second embodiment of the invention is designed to utilize a vehicle-mounted alternator in combination with a chain saw engine unit. As is known, vehicles are conventionally provided with an engine-driven alternator which acts to charge the vehicle battery during engine operation. By operatively connecting a portable chain saw engine unit to such vehicle alternator, a simple, easily assembled apparatus for charging a vehicle battery is provided.

It is therefore a primary object of the present invention to provide a hand portable electrical generator apparatus powered by the engine unit of a conventional chain saw.

Another object of the present invention is to provide an electrical generator apparatus which may be easily and simply assembled and operated.

Yet another object of the invention is to provide a battery-charging apparatus which includes a vehicle-mounted alternator and the engine unit of a chain saw of the portable, hand held type.

It is another object of the invention to provide apparatus for adapting a conventional engine unit of a chain saw for use in driving a vehicle-mounted alternator.

It is still another object of the invention to provide a method for charging a vehicle battery by means of a conventional chain saw.

DRAWINGS

These and other objects and features of the present invention will now be more fully described with reference to the detailed description of preferred embodiments of the invention and the accompanying drawings, wherein.

DETAILED DESCRIPTION OF PREFERRED EMBODIMENTS OF THE INVENTION

Figure 1:
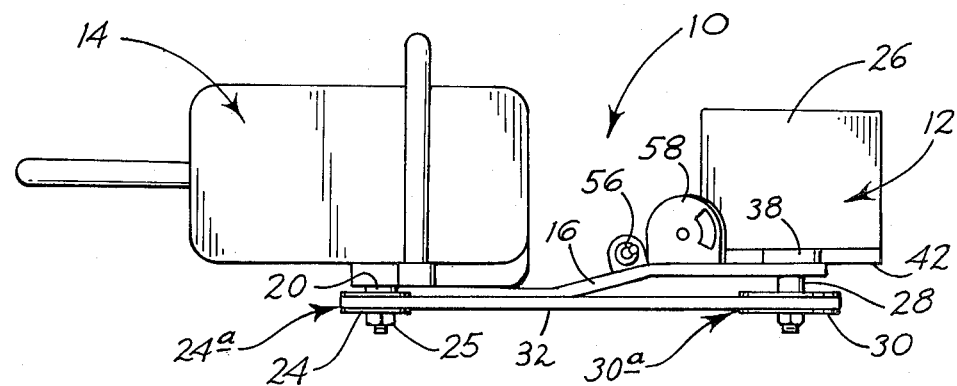
FIG. 1 is a partially diagramatic, top plan view of a generator apparatus constructed according to an embodiment of the present invention.
Figure 2:
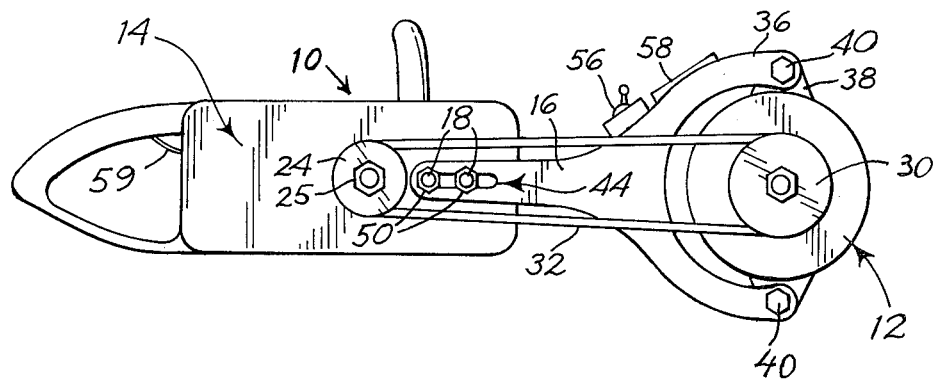
FIG. 2 is a side view of the invention shown in FIG. 1.

Referring first to FIGS. 1 and 2, there is shown generally at 10 apparatus constructed according to a preferred embodiment of the present invention. Apparatus 10 generally comprises a generator 12, an engine unit 14 of a conventional hand portable chain saw, means mounting the generator to the engine unit, such as a bracket 16, and means rotatably coupling the output of engine 14 to generator 12.

A conventional chain saw, of which unit 14 forms a part, normally includes an elliptical chain bar (not shown) mounted on a pair of bolts 18 projecting from the side of the engine unit, shown in FIG. 2. The chain bar accommodates a cutter chain (not shown) which is trained about the chain bar and engaged rearwardly with a motor-driven sprocket (not shown). Normally, the engine shaft 20 on which the sprocket is mounted is coupled to the engine through a centrifugal clutch, such that chain drive is disengaged at engine idling speed, and progressively engaged as the engine speed is increased.

To adapt the above-described chain saw for use in the present invention, the cutter bar is detached from bolts 18, the cutter chain removed from the sprocket, and a driving pulley 24 attached to shaft 20 for rotation therewith. The latter may be done by removing the shaft nut 25 securing the sprocket to the shaft, and substituting pulley 24 for the sprocket on shaft 20. Replacing nut 25 on the shaft then secures the pulley to the shaft. Alternatively, the pulley may be clamped directly to the sprocket for rotation therewith. A disc-shaped pulley adapted at its inwardly-facing side to be clamped to the sprocket, or a ring-shaped pulley having expandable jaws adapted to engage the teeth of the sprocket, may be used for this purpose.

Generator 12 is a conventional portable generator which includes a casing 26, which houses a rotor and stator (not shown), and includes a rotor shaft 28 extending outwardly from the housing. Attached to rotor shaft 28 for rotation therewith is a pulley 30. Generator 12 is operable to produce an electric current upon rotation of shaft 28. Pulleys 24, 30 provide annular belt grooves 24a, 30a, respectively, for receiving therearound an endless belt 32, as described below.

Mounting means for mounting the generator to the engine unit generally includes a bracket, such as Y-shaped bracket 16 seen in FIGS. 1 and 2. Generator 12 is rigidly attached to bracket 16 by bolts 40 which secure the ends of the bracket arms 36 to the associated generator casing mounts 38. Mounts 38 are integrally formed with the generator casing 26 adjacent and at diametrically opposed sides of, the generator front wall 42.

The end portion of bracket 16 opposite arms 36 is provided with an elongate groove 44 for receiving therein bolts 18. The length of groove 44 is preferably greater than the spacing between bolts 18. This allows bracket 16 to be attached to chain saw engine units having different spacing between their mounting bolts 18. It further allows linear adjustment of the position of bracket 16 in relation to the engine unit, as explained below. As seen in FIG. 1, bracket 16 is angled in its central region, whereby the plane occupied by arms 26 is offset from the plane occupied by the opposite end of the bracket. By this angular offset, the belt grooves of pulleys 24, 30 are substantially aligned.

Coupling means operatively connecting shaft 20 to rotor shaft 28 comprises pulley means such as pulleys 24, 30 and belt means, such as an endless belt 32 trained over the pulleys. In assembling the generator apparatus, bracket 16 is mounted on engine unit bolts 18, with the nuts 50 on bolts 18 being only partially tightened, permitting sliding movement of the bracket relative to the engine unit. After belt 32 is trained about pulleys 24, 30, generator 12 is moved outwardly in a direction away from the engine unit until belt 32 between pulleys 24, 30 is taut. Nuts 50 are then tightened to secure the generator in a fixed position relative to the engine unit.

Figure 3:
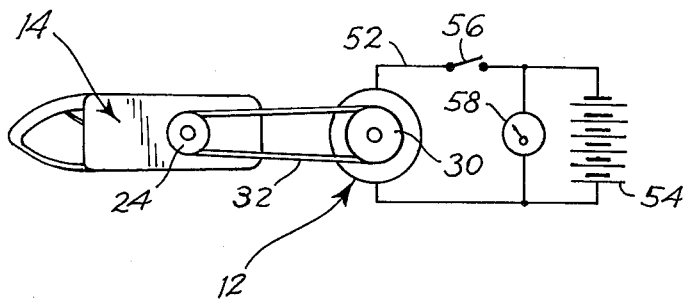
FIG. 3 is a side view of the invention and also shows in schematic view, electrical circuitry which may be employed in practicing the present invention.

With reference to FIG. 3, the electrical output of genertor 12 is carried by wires 52 to a load, such as the battery indicated at 54. A switch 56, connected in series with one of wires 52 may be either a simple on/off switch or a rheostat switch for varying the voltage output of generator 12. Electric meter means, here shown as voltmeter 58, is appropriately connected to wires 52, here shown connected in parallel with the load, whereby the voltmeter may be used either to measure the voltage output of the generator, in the absence of a load, or to measure the output of battery 54, when switch 56 is open. As shown in FIGS. 1 and 2, switch 56 and meter 58 are mounted on bracket 16.

The operation of the hand portable generator apparatus can now be appreciated. The generator is assembled by first disassembling a conventional chain saw, equipping the chain saw engine unit with a pulley, and mounting to the engine unit a generator 12, as described above. To operate the generator, the engine is conventionally throttled, engaging the engine centrifugal clutch and imparting torque from pulley 24, through belt 32, to pulley 30. Generator output wires 52, connected to a load, may be selectively engaged therewith by switch 56.

Figure 4:
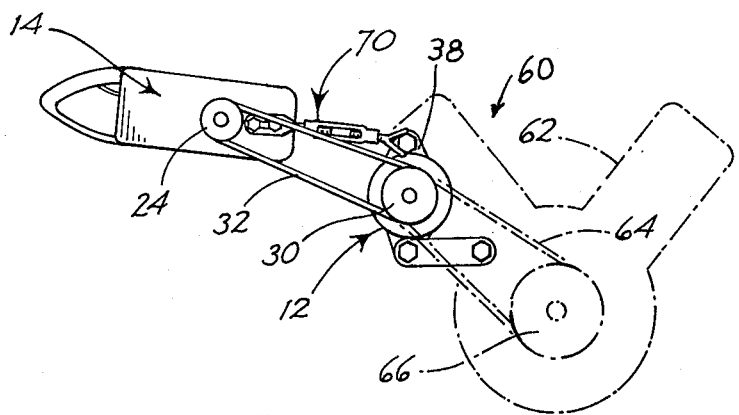
FIG. 4 is a partially diagramatic, front plan view of a generator constructed according to an alternate embodiment of the present invention, wherein a vehicle-mounted alternator is employed.

Referring now to FIG. 4, there is shown generally at 60 an apparatus useful in charging a vehicle battery constructed according to a second embodiment of the present invention. Apparatus 60 generally comprises a chain saw engine unit 14, a generator 12, shown here mounted to the engine 62 of a vehicle, means for positioning the engine unit and generator in spaced-apart relationship, and an endless belt 32 operatively connecting the two.

Engine unit 14 is a hand held, portable engine having a power driven shaft 20 on which pulley 24 replaces the conventional chain sprocket, as described above. Generator 12 is a conventional vehicle alternator attached to engine 62 at mounts 38. During vehicle use, generator 12 is rotably powered by a fan belt 64 trained over the generator pulley 30 and the vehicle engine shaft pulley 66. The generator is electrically connected to the vehicle battery by a voltage regulator (not shown), with the battery being charged during vehicle use according to the rate of battery discharge. Alternator 12 is adapted for use in the present invention by conventionally disengaging fan belt 64 from pulley 30, whereupon the alternator pulley is freely rotatable.

Figure 5:
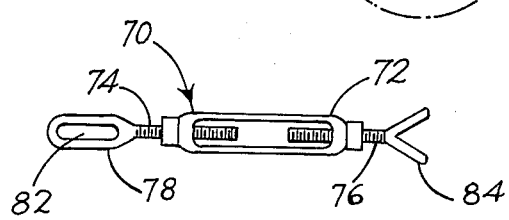
FIG. 5 is a side view of a brace used in practicing the invention of FIG. 4.

Endless belt 32 is trained about engine unit pulley 24 and freely rotating generator pulley 30, with the engine unit and generator being positioned in such spaced-apart relationship that endless belt 32 is held taut therebetween. Means for positioning the engine unit at a desired position relative to the vehicle generator generally includes an adjustable-length brace 70. As shown in FIG. 5, brace 70 may be a turnbuckle having a link 72 threadably receiving bolts 74, 76 at opposite endsthereof. Attached to the free end of bolt 74 is a plate 78, providing a slot 82 for receiving therein bolts 18, thus to mount the turnbuckle to the chain saw engine unit. Attached to the free end of bolt 76 is a V-shaped member 84 engageable with a fixed vehicular structure, such as a generator mounting bolt, as shown in FIG. 4. With belt 32 trained about pulleys 24, 30, turnbuckle 70 is adjusted to a position producing the configuration shown in FIG. 4, wherein belt 32 may be held taut by applying a force tending to rotate unit 14 and brace 70 in a clockwise direction about the brace's attachment to the generator mounting bolt, thus to space pulleys 24, 30 further apart. It can be appreciated that in this configuration, unit 14 and brace 70 act as a lever arm which can be pivoted manually to provide considerable mechanical advantage in maintaining belt 32 taut during the operation of unit 14.

For operation, engine unit 14 is throttled to engage the power-driven shaft 20, whereupon engine-driven pulley 24 drives alternator pulley 30 through belt 32. As stated above, the electrical connection between alternator 12 and the vehicle battery is operative to effect charging of the vehicle battery as the alternator is rotatably driven.

There is thus disclosed adapter apparatus for adapting a chain saw engine unit having a power driven shaft to drive a generator which is operable to produce an electric current upon rotation of a freely rotating generator pulley. Such generally comprises an engine pulley attachable to the engine unit shaft for rotation therewith, an endless belt trainable over the engine and generator pulleys, and a brace for positioning the engine units and the generator in a spaced apart relationship.

There is further provided a method for utilizing an engine of the hand held portable type and a vehicle-mounted alternator to charge a vehicle battery, wherein the hand held engine is operable to drive an engine shaft and the alternator is operable to charge the battery upon rotation of a freely rotating generator pulley. The method comprises attaching an engine pulley to the engine shaft for rotation therewith, training an endless belt about the generator and engine pulleys and operating the hand held engine.

An apparatus and method for charging a vehicle battery using the engine unit of a conventional chain saw, and an easily assembled electrical generator powered by the engine unit of a conventional chain saw, have thus been disclosed. Various modifications and changes in the above-described chain saw driven generators may be made without departing from the true spirit of the invention, as encompassed by the following claims.

It is claimed and desired to secure by Letters Patent:

1. In a vehicle having an engine, a battery, an engine-mounted generator which includes a rotor shaft pulley, and a fan belt operatively connecting the vehicle engine to said pulley, to rotate the same, and thus to charge said battery, apparatus for adapting a chain saw engine unit having a power-driven shaft to effect charging of said battery when said fan belt has been disengaged from said pulley, said apparatus comprising
   a driving pulley attachable to said power-driven shaft for rotation therewith,
   belt means trainable over said driving and rotor shaft pulleys, and
   a brace attachable to said engine unit to form therewith a lever arm which is mountable on said vehicle engine for pivoting thereabout, thus to produce variable spacing between the driving and rotor shaft pulleys.

2. In a vehicle having an engine, a battery, an engine-mounted generator which includes a rotor shaft pulley, and a fan belt operatively connecting the vehicle engine to the pulley, to rotate the same, and thus to charge the battery, a method of adapting a chain saw engine unit to effect charging of the battery, said method comprising
   disengaging the fan belt from the rotor shaft pulley,
   attaching a driving pulley to the power-driven shaft,
   training an endless belt about driving and rotor shaft pulleys,
   attaching an elongate brace adjacent one of its ends, to the engine unit,
   mounting the brace, adjacent its other end, on the vehicle engine, for pivoting thereabout,
   pivoting the unit and attached brace about the vehicle engine,
   by such pivoting, varying the spacing between the driving and rotor shaft pulleys to produce tautness in the endless belt, and
   operating the engine unit, to rotate the rotor shaft pulley, thus to charge the battery.

* * * * *